Sept. 18, 1934.　　　　W. G. ROBY　　　　1,974,379
COUPLING DEVICE FOR HOSE AND LIKE CONNECTIONS
Filed Oct. 12, 1932
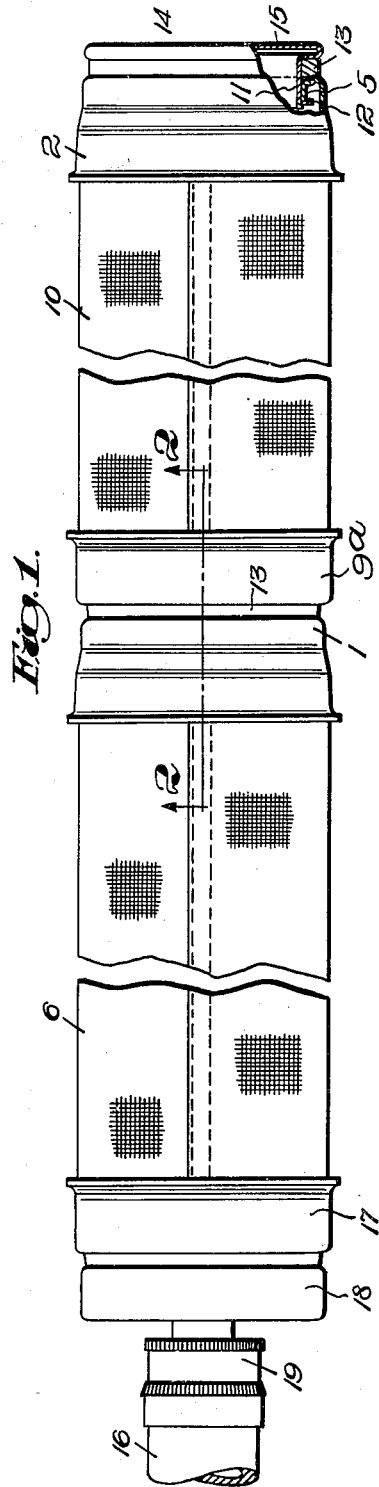
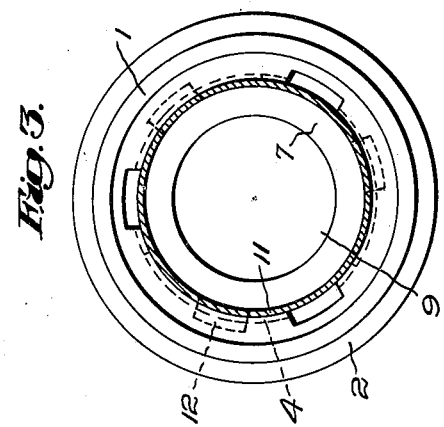
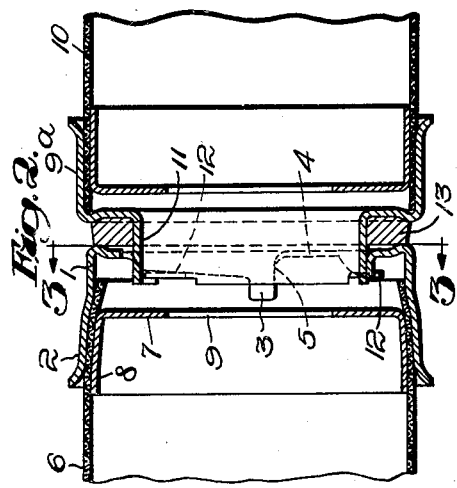
Inventor:
William G. Roby,
by Emery, Booth, Varney & Townsend
Attys Patented Sept. 18, 1934

1,974,379

UNITED STATES PATENT OFFICE 1,974,379

COUPLING DEVICE FOR HOSE AND LIKE CONNECTIONS

William G. Roby, Chicago, Ill., assignor to Cinch Manufacturing Corporation, Chicago, Ill., a corporation of Illinois Application October 12, 1932, Serial No. 637,448

1 Claim. (Cl. 285—75)

My invention aims to provide improvements in coupling devices for hose and the like connections.

In the drawing which illustrates preferred embodiments of my invention:—

Figure 1 is a plan view of an installation showing my invention in various uses;

Fig. 2 is an enlarged section taken on the line 2—2 of Figure 1; and

Fig. 3 is a section taken on the line 3—3 of Fig. 2.

My invention, as best illustrated by the annexed drawing, is particularly useful in connection with a porous hose used for irrigating purposes. The coupling means may comprise various combinations to suit different purposes. For instance, an ordinary coupling of two pieces of hose may be accomplished, as shown at the center portion of Figure 1 and also by Fig. 2. A closure cap may be secured to one coupling element at the end of the hose, as shown at the right of Figure 1. Also, a large porous hose may be coupled with a smaller hose, as shown at the left of Figure 1.

My improved coupling means is so simple that it may be easily and quickly installed even by the user of the hose. Therefore, the ultimate user may buy the hose material separate from the coupling members and install them in accordance with any length of hose he may require.

Referring now to the coupling means illustrated by Figs. 2 and 3, I have shown a part 1 formed from a single piece of sheet metal and having a tubular portion 2, an inwardly turned flange 3 at one end, cam portions 4 extending from said flange 3 and stops 5 provided at the ends of the cam portions 4. The part 1 is secured to the end of a relatively thin, flexible, porous hose 6 by a cup-shaped member 7 having a tubular portion 8 and an aperture 9 in the bottom. To attach the parts 1 and 7 to the hose 6, it is only necessary to insert the part 7 into the hose 6 and then insert the end of the hose and the part 7 into the tubular portion 2 of the part 1. Then by pressing the parts toward each other the hose will be gripped tightly between the tubular portions 2 and 8 merely by a force fit.

The other coupling member 9ª is secured to the hose 10 in the same manner as the part 1, as above described. This member 9 has a tubular extension 11 adapted to fit into the aperture surrounded by the flange 3 of the part 1 and is provided at its free end with lugs 12 (Fig. 3) adapted to engage the edges of the cam portions 4.

Before coupling the parts 1 and 9 together a rubber, or the like, washer 13 is placed over the tubular extension 11 so that when the parts are engaged the washer will be compressed and act as a friction spring-like means to prevent unlocking of the coupling members. The washer 13 also prevents water from leaking out at the joint, thereby insuring passage to the hose 10 of a sufficient quantity of water to seep from the pores thereof throughout its length.

The hose material 6 and 10 is made porous so that when laid between rows of vegetables, flowers and the like, or upon a lawn, the water will flow therefrom in all directions. This is a recently discovered method of irrigation and my improved coupling means has been found to provide the simple and efficient coupling desired.

It is, of course, desirable to close one end of the hose and therefore when a coupling part 1 is at the free end I may secure thereto a closing cap 14. The closing cap is constructed in much the same manner as the part 9 with the exception of the closing wall 15, as shown at the right-hand end of Figure 1.

I have also found that it may be desirable to convey water to the irrigation hose through another hose 16 not porous and of smaller diameter or of the ordinary garden type, as shown at the left of Figure 1. Therefore, it is necessary to provide a part 17 like the part 1 with the exception of the fact that it has means 18 for coupling engagement with the coupling member 19 on the hose 16.

My improved coupling devices are simple, inexpensive, durable, easy to operate and easy to attach. Therefore, they have solved a coupling problem for a new structure in a highly efficient and desirable manner.

While I have illustrated and described specific forms of my invention I do not wish to be limited thereby, because the scope of my invention is best defined by the following claim.

I claim:

The combination with a porous hose of a coupling device including a pressed sheet metal part having a coupling portion for engagement with a corresponding part on another hose, said part having a sleeve portion fitting over the end of the hose, and a sheet metal cup shaped member apertured at the bottom and located within the end of the hose and said cup-shaped member having a continuous peripheral wall forced into place within the sleeve portion to grip the hose tightly between the cup member and the sleeve thereby securing the said part to the hose.

WILLIAM G. ROBY.